(12) United States Patent
Anderson et al.

(10) Patent No.: US 10,116,522 B2
(45) Date of Patent: Oct. 30, 2018

(54) UTILIZING SOCIAL MEDIA FOR INFORMATION TECHNOLOGY CAPACITY PLANNING

(71) Applicant: International Business Machines Corporation, Armonk, NY (US)

(72) Inventors: Eric M. Anderson, Friendswood, TX (US); Robert A. Davis, Atlanta, GA (US); Christopher J. Dawson, Arlington, VA (US); Salvatore T. Lococo, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 15/042,175

(22) Filed: Feb. 12, 2016

(65) Prior Publication Data

US 2016/0164747 A1 Jun. 9, 2016

Related U.S. Application Data

(63) Continuation of application No. 13/909,261, filed on Jun. 4, 2013, now Pat. No. 9,299,112.

(51) Int. Cl.
*H04L 12/24* (2006.01)
*G06Q 50/00* (2012.01)
*G06Q 10/06* (2012.01)
*H04L 12/911* (2013.01)

(52) U.S. Cl.
CPC ....... *H04L 41/147* (2013.01); *G06Q 10/0631* (2013.01); *G06Q 50/01* (2013.01); *H04L 41/145* (2013.01); *H04L 47/823* (2013.01); *G06F 2209/5019* (2013.01)

(58) Field of Classification Search
CPC ...................................... H04L 41/147
See application file for complete search history.

(56) References Cited

U.S. PATENT DOCUMENTS

| | | | |
|---|---|---|---|
| 7,003,560 B1 | 2/2006 | Mullen et al. | |
| 7,249,179 B1 * | 7/2007 | Romero | G06F 9/5083 709/221 |
| 8,230,062 B2 | 7/2012 | Newton | |
| 8,291,016 B1 | 10/2012 | Whitney et al. | |

(Continued)

OTHER PUBLICATIONS

Guendert et al.; "Enhanced Data Availability and Business Continuity with the IBM Virtual Engine TS7700 and Brocade Integrated Network Grid Solution"; Redguides for Business Leaders; Redbooks; Copyright 2012 IBM Corporation, 22 pages.

(Continued)

*Primary Examiner* — Andrew Georgandellis
(74) *Attorney, Agent, or Firm* — Christopher K. McLane

(57) ABSTRACT

One or more processors compute a number of times that a string of text is identified within an online news feed. One or more processors compute a score for the string of text, at least in part, by multiplying the number of times the string of text is identified within the online news feed by a number representing a uniqueness of the string of text. In response to a determination that the score exceeds a first configurable threshold value, one or more processors generate an electronic notification. The electronic notification alerts of an anticipated change in one or more computer hardware capacity requirements of a networked computer system.

15 Claims, 4 Drawing Sheets

(56) References Cited

U.S. PATENT DOCUMENTS

| | | |
|---|---|---|
| 8,307,086 B2 | 11/2012 | Whitnah et al. |
| 8,788,654 B2 | 7/2014 | Hildebrand |
| 8,799,009 B2 | 8/2014 | Mellin et al. |
| 2007/0168494 A1 | 7/2007 | Liu et al. |
| 2009/0063455 A1* | 3/2009 | Li .................... G06F 17/30864 |
| 2011/0264507 A1* | 10/2011 | Zhou ...................... G06Q 30/02 |
| | | 705/14.42 |
| 2012/0144038 A1* | 6/2012 | Hildebrand ......... H04L 41/0806 |
| | | 709/226 |
| 2012/0179822 A1* | 7/2012 | Grigsby ................ G06F 9/5072 |
| | | 709/226 |
| 2012/0233328 A1 | 9/2012 | Iyoob et al. |
| 2012/0296845 A1 | 11/2012 | Andrews et al. |
| 2013/0103823 A1 | 4/2013 | DeJana et al. |
| 2014/0359010 A1 | 12/2014 | Anderson et al. |

OTHER PUBLICATIONS

Lovelace et al.; "SONAS Concepts, Architecture, and Planning Guide"; Redbooks; <ibm.com/redbooks>, 460 pages.

\* cited by examiner

UTILIZING SOCIAL MEDIA FOR INFORMATION TECHNOLOGY CAPACITY PLANNING

BACKGROUND

1. Field of the Invention

The present invention relates generally to capacity planning for a networked computer system, and more particularly to searching social media including news feeds to collect data utilized to estimate computer hardware capacity requirements for building, support, and maintenance of a networked computer system.

2. Description of the Related Art

Capacity planners within an Information Technology (IT) organization are often supplied with incomplete or erroneous data from which to estimate computer hardware capacity requirements for building, support, and maintenance of a networked computer system that provides IT services. Furthermore, even if the data supplied is accurate, receipt of the data by the capacity planners if often delayed to an extent such that the data is no longer a useful source from which to estimate the computer hardware capacity requirements.

Networked computer systems have many server computers distributed over various physical locations in order to provide IT services such as web hosting and other e-commerce services. The server computers may process millions of electronic requests from end-users (e.g., customers) on a daily basis. Capacity planners need to have accurate data from which to accurately estimate the computer hardware capacity requirements. If the capacity planners accurately estimate the computer hardware capacity requirements, then the capacity requirements can be utilized to allocate a sufficient number of computer hardware resources to the networked computer system and thereby satisfy end-user demand for the IT services even if the networked computer system experiences unusual sharp increases in the number of electronic requests.

Currently, as mentioned above, data from which to estimate the computer hardware capacity requirements is often inaccurate and/or delayed, which can result in a failure to allocate a sufficient number of computer hardware resources to the networked computer system and satisfy end-user demand for the IT services. Failure to allocate a sufficient number of computer hardware resources to the networked computer system can result in a disruption of the IT services, as well as a decrease in end-user satisfaction and profits.

SUMMARY

Embodiments of the present invention provide a method, system, and program product to utilize social media for information technology capacity planning. One or more processors compute a number of times that a string of text is identified within an online news feed. One or more processors compute a score for the string of text, at least in part, by multiplying the number of times the string of text is identified within the online news feed by a number representing a uniqueness of the string of text. In response to a determination that the score exceeds a first configurable threshold value, one or more processors generate an electronic notification, wherein the electronic notification alerts of an anticipated change in one or more computer hardware capacity requirements of a networked computer system.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
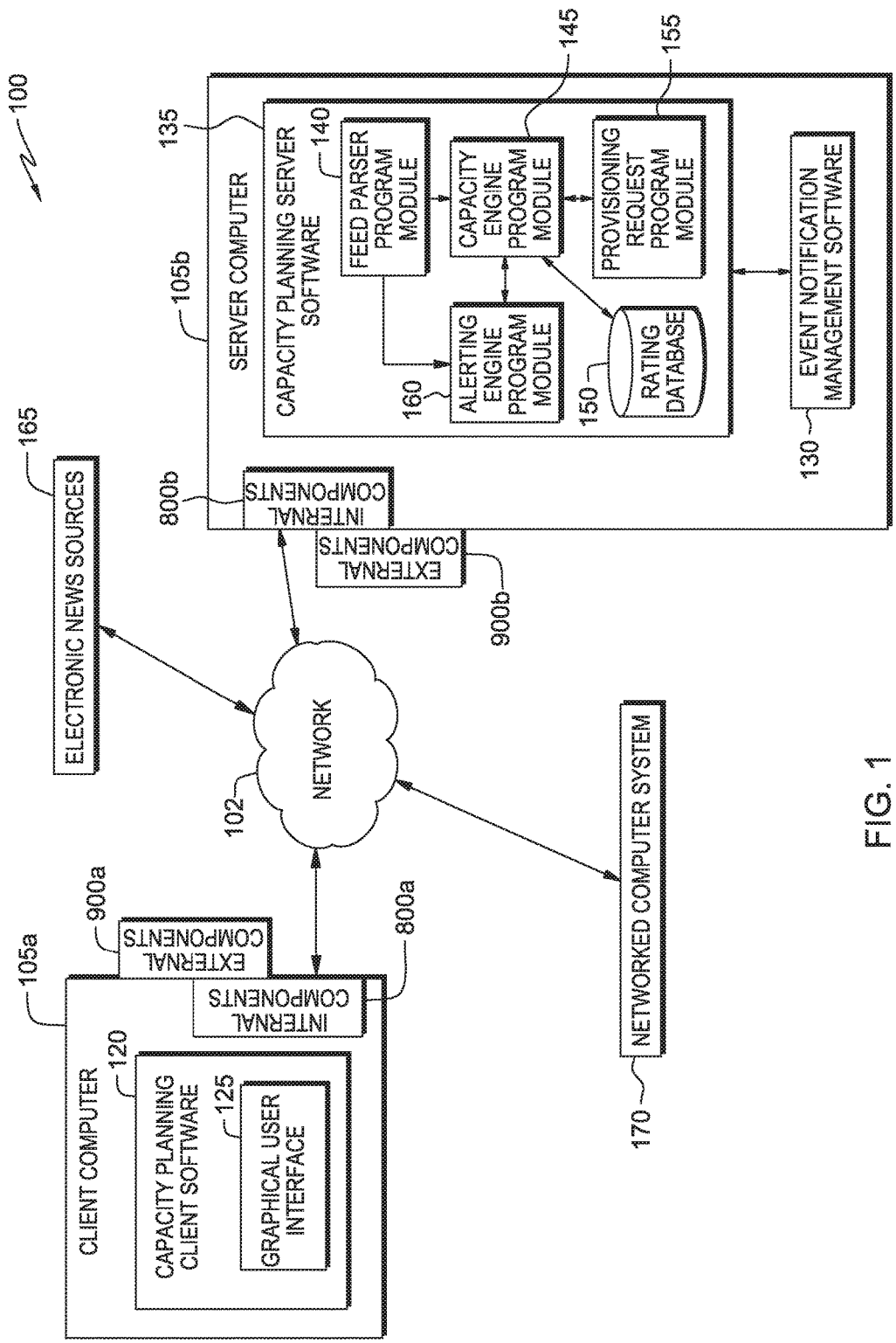
FIG. 1 is a block diagram of a distributed computer system, including a client computer having capacity planning client software and a server computer having capacity planning server software, wherein the capacity planning client software and the capacity planning server software are program code that searches electronic news sources (i.e., electronic media sources) to collect data utilized to estimate computer hardware capacity requirements for building, support, and maintenance of a networked computer system according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer-readable storage medium, as used herein, is not to be construed as being transitory signals per se.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a language translation management program module for searching news feeds of electronic news sources (i.e., electronic media sources) to collect data utilized to estimate computer hardware capacity requirements for building, support, and maintenance of a networked computer system.

FIG. 1 illustrates computer system 100 that includes client computers 105a, network 102, server computer 105b, electronic news sources 165, and networked computer system 170. Client computer 105a and server computer 105b can interact and exchange data (i.e., communicate) with each other via network 102. Client computer 105a and server computer 105b each include respective internal components 800a and 800b, and respective external components 900a and 900b, as described below in more detail with respect to FIG. 3. Client computer 105a is installed with capacity planning client software 120 having graphical user interface 125. Server computer 105b is installed with event notification management software 130 and capacity planning server software 135 having feed parser program module 140, capacity engine program module 145, rating database 150, provisioning request program module 155, and alerting engine program module 160.

Capacity planning client software 120 allows an end-user (e.g., a system programmer/administrator) of client computer 105a to view and monitor, via graphical user interface 125, events that are occurring within electronic news sources 165. For example, the end-user can view and monitor managed computer systems (i.e., capacity), related media sources and business rules as well as capacity related events via graphical user interface 125. Electronic news sources 165 can include company and product based news (e.g., news websites) and chat groups that are associated to the managed computer systems, and further include industry marketplaces and social media (e.g., forums, social networking websites, and blogs) also associated to the managed computer systems. In addition, the end-user can view, via graphical user interface 125, electronic notifications about events that may affect the IT services provided by networked computer system 170, wherein the electronic notifications are generated by event notification management software 160. The IT services provided by networked computer system 170 can include the following: marketing websites, transactional websites, and/or any IT resource supporting businesses that own or lease managed computer systems (capacity) which computer system 100 is monitoring and managing.

Capacity planning server software 135 searches electronic news sources 165 to collect data utilized to estimate computer hardware capacity requirements for building, support, and maintenance of networked computer system 170. In particular, capacity planning server software 135 includes feed parser program module 140 that searches news feeds of electronic news sources 165 for a string of plain text based on rules that define which of the news feeds to search (e.g., rules that define the news feeds to subscribe to), and also define the string of plain text to search for within the news feeds. The rules that define which of news feeds to search and the string of plain text to search for within the news feeds can be configured via capacity planning server software 135 by a system programmer/administrator. The string of plain text is one or more words that subsequent to being identified in a news feed of electronic news sources 165, has a high statistical correlation (e.g., a statistical correlation ranging from about 0.8 to 1) to a change in the computer hardware capacity requirements mentioned above. Thus, if feed parser program module 140 identifies the string of plain text in a news feed, then a system programmer/administrator can expect the computer hardware capacity requirements for building, support, and maintenance of networked computer system 170 to change. The statistical correlation can be determined based on historical data analysis performed manually or in an automated fashion by utilizing data mining and statistical analysis computer software.

Thus, feed parser program module 140 searches news feeds of electronic news sources 165 for a string of plain text utilizing the rules discussed above, wherein the string of plain text is associated with a count parameter for storing a value representing the number of times the string of plain text is identified within the news feeds. Based on the search of the news feeds, feed parser program module 140 computes the number of times the string of plain text is identified within the news feeds, and sets the count parameter associated with the string of plain text to the number of times the string of plain text is identified within the news feeds. In addition, feed parser program module sends the string of plain text and the count parameter associated with the string of plain text to capacity engine program module 145. Capacity engine program module 145 can receive as inputs the string of plain text and the count parameter associated with the string of plain text, and utilize the string of plain text to query rating database 150 for a number representing uniqueness of the string of plain text, and for a rating (i.e., a statistical correlation value) assigned to the string of plain text. Thus, rating database 150 stores a record for each string of plain text that is defined by the rules. Specifically, each record within rating database 150 includes a field for storing a string of plain text, a field for storing a number representing the uniqueness of the string of plain text, a field for storing a type of search (e.g., search for company name, search for name of a person, search for product name, or search for location name) for which the string of plain text is utilized to search a news feed of electronic news sources 165, a field for storing a unique identifier (unique ID) of computer hardware (e.g., a unique ID associated to a radio-frequency identification tag attached to the computer hardware) that may be needed subsequent to a usage of the string of plain text in the news feed of electronic news sources 165, a field for storing a name of a person to contact for the computer hardware that may be needed subsequent to the usage of the string of plain text in the news feed of electronic news sources 165, and a field for storing a rating assigned to the string of plain text. The rating assigned to a string of plain text is the statistical correlation between a use of the string of plain text within a news feed of electronic news sources 165, and a subsequent change in the computer hardware capacity requirements for building, support, and maintenance of a networked computer system.

Furthermore, capacity engine program module 145 computes a score for each string of plain text that is searched for and identified within news feeds of electronic news sources 165. The score is computed by multiplying the number of times a string of plain text is identified within the news feeds by a number representing the uniqueness of the string of plain text, and by a rating (i.e., a number that is a statistical correlation value) assigned to the string of plain text. Capacity engine program module 145 generates a recommendation for an action that needs to be performed based on the score, and sends the score and a record for the string of plain text to alerting engine program module 160. For example, the action can be notification via a paging system, event console, and/or e-mail of an impending change in load on a specified computer system of networked computer system 170, as a result of trends detected in social media that is being monitored. Based on the score received, alerting engine program module 160 can generate an electronic notification that includes the recommendation generated in order to alert the end-user of an anticipated change in the computer hardware capacity requirements for building, support, and maintenance of a networked computer system 170. In particular, the alert is generated if the score is greater than a first configurable threshold value. The electronic notification generated can include a unique identifier (unique ID) of computer hardware, a recommendation for how computer hardware should be allocated within networked computer system 170 based on the anticipated change, and can also include other information from a field of a record within rating database 150. The electronic notification generated can be sent by alerting engine program module 160, via network 102, to capacity planning client software 120 for viewing by the end-user. Based on the electronic notification viewed by the end-user, the end-user may decide to intervene by manually allocating, via graphical interface 125, additional computer hardware within networked computer system 170.

In addition, alerting engine program module 160 can manage a list (e.g., a file) of contact information stored on a hard drive of server computer 105*b*, and send the electronic notification and a request to event notification management software 130 to forward the electronic notification generated to one or more persons named within the contact information. Thus, the list of contact information managed by alerting engine program module 160 can include names of persons, and an e-mail address for each of the persons to whom event notification management software 130 can forward the electronic notifications received.

Furthermore, capacity engine program module 145 estimates computer hardware capacity requirements by extrapolating an expected number of matches within electronic news sources 165 (i.e., an expected number of times a string of plain text is identified within a news feed), based on the actual number of matches within electronic news sources 165 detected over a specific period of time. In one embodiment, the expected number of matches estimated may be multiplied by a factor that can be based on a priority assigned to one or more of electronic new sources 165. The factor can represent the relevance (i.e., the importance) of one or more electronic news sources 165 in estimating computer hardware capacity requirements. In addition, capacity engine program module 145 compares the score for each string of plain text that is searched for and identified within news feeds of electronic news sources 165, to a second configurable threshold value. Based on the comparison, if the second configurable threshold value is exceeded, then capacity engine program module 145 can instruct provisioning request program module 155 to generate a request to adjust allocation of computer hardware within networked computer system 170, in order to satisfy the computer hardware capacity requirements estimated. Provisioning request program module 155 can send the request generated to client computer 105*a* for viewing, via graphical user interface 125, by the end-user. The end-user can perform an action, based on the request generated, to adjust the allocation of computer hardware within networked computer system 170.

Networked computer system 170 can include a web server cluster for sending web content to a computer have a web browser in response to an electronic request from the computer for the content, application server cluster for managing connections to a database server cluster and managing requests for IT services provided by the networked computer system 170, and database server cluster for providing high availability storage services, and additional computer hardware utilized as reserve capacity. Specifically, the additional computer hardware utilized as reserve capacity can be allocated for the web server cluster, the application server cluster, and/or the database server cluster based on a computer generated instruction sent by provisioning request program module 155 to networked computer system 170. Moreover, allocation of the additional computer hardware utilized as reserve capacity can also be performed manually by the end-user via graphical user interface 125, based on information the end-user views within an electronic notification sent by alerting engine program module 160 and/or a request sent by provisioning request program module 155.

Figure 2A:
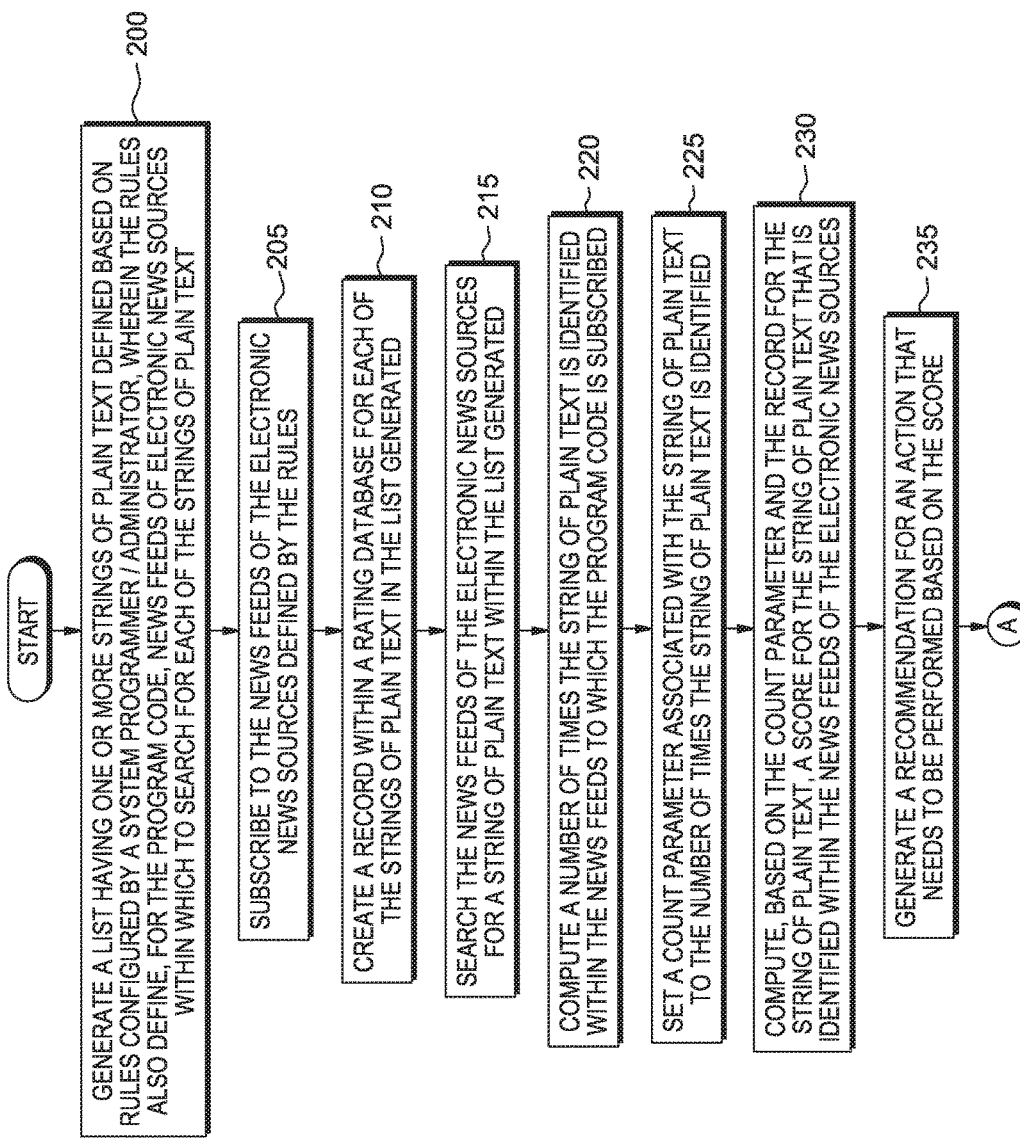
FIGS. 2A and 2B are flowcharts illustrating operations of the program code according to an embodiment of the present invention.
Figure 2B:
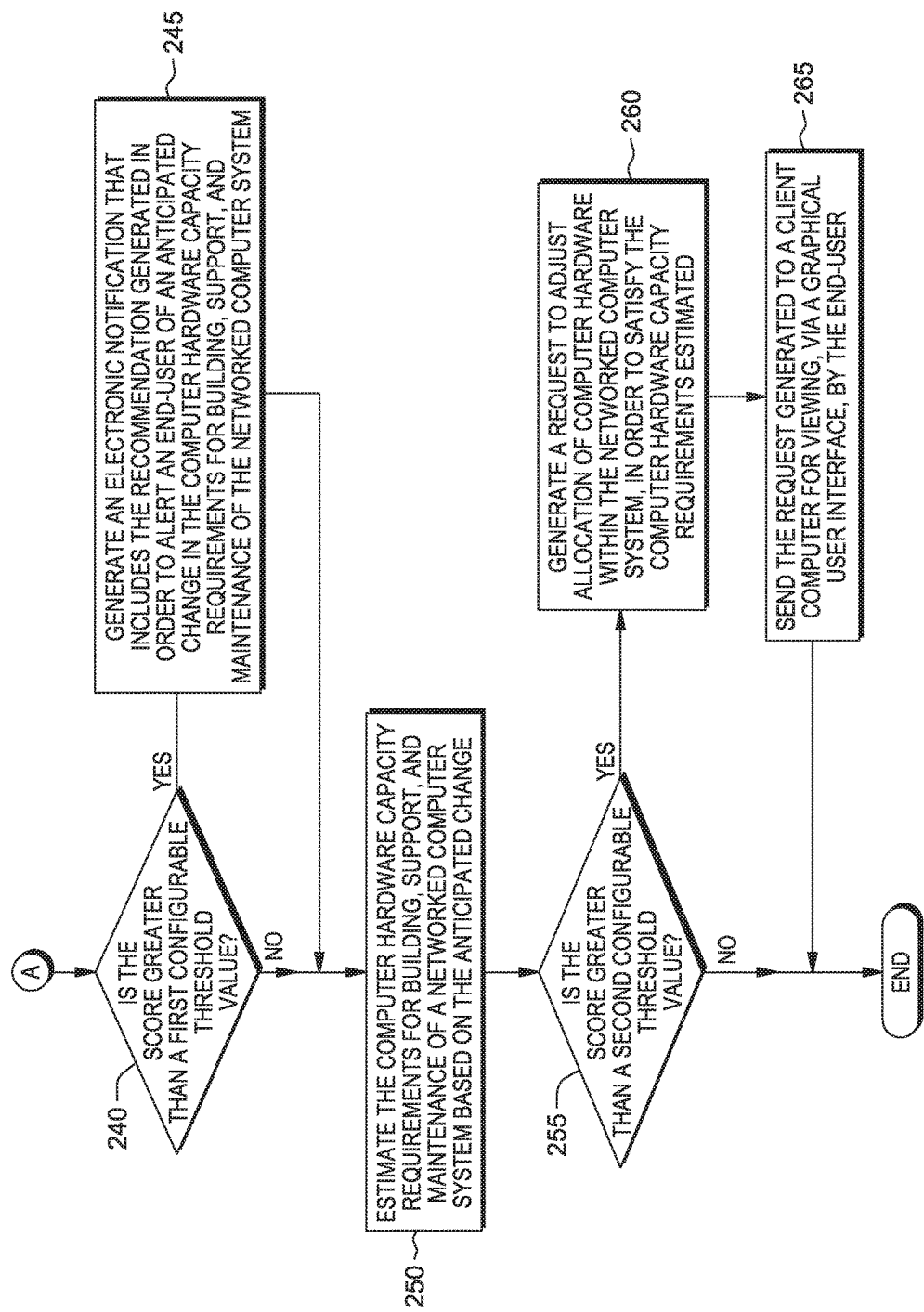

FIGS. 2A and 2B are flowcharts illustrating the steps of the program code, capacity planning client software 120 and capacity planning server software 135, for searching news feeds of electronic news sources 165 to collect data utilized to estimate computer hardware capacity requirements for building, support, and maintenance of networked computer system 170. In the disclosed embodiment, the program code on server computer 105b generates a list (e.g., a file) having one or more strings of plain text defined based on rules configured by a system programmer/administrator, wherein the rules also define, for the program code, news feeds of electronic news sources 165 within which to search for each of the strings of plain text (block 200). The program code subscribes (i.e., connects) to the news feeds of electronic news sources 165 defined by the rules (block 205).

Next, the program code creates a record within rating database 150 for each of the strings of plain text in the list generated (block 210), wherein each of the records has the following fields: a first field for storing a string of plain text, a second field for storing a number representing the uniqueness of the string of plain text, a third field for storing a type of search for which the string of plain text is utilized to search a news feed of electronic news sources 165, a fourth field for storing a unique ID of computer hardware (e.g., a unique ID associated to a radio-frequency identification tag attached to the computer hardware) that may be needed subsequent to a usage of the string of plain text in the news feed of electronic news sources 165, a fifth field for storing a name of a person to contact for the computer hardware that may be needed subsequent to the usage of the string of plain text in the news feed of electronic news sources 165, and a sixth field for storing a rating assigned to the string of plain text. Moreover, the fields within each record are configured (i.e., populated with a value) via a database script or manually by a system programmer/administrator, wherein the first field stores a string of plain text, the second and sixth fields of each record store a number that can be subsequently utilized by the program code to compute a score for the string of plain text that is searched for and identified within news feeds of electronic news sources 165. The score computed can be subsequently utilized by the program code to determine whether hardware capacity requirements for building, support, and maintenance of a networked computer system 170 need to be estimated.

Upon the program code creating a record within rating database 150 for each of the strings of plain text in the list generated, the program code searches the news feeds of electronic news sources 165 for a string of plain text within the list generated (block 215). Next, the program code computes a number of times the string of plain text is identified within the news feeds to which the program code is subscribed (block 220), and sets a count parameter associated with the string of plain text to the number of times the string of plain text is identified (block 225). Next, the program code computes, based on the count parameter and the record for the string of plain text, a score for the string of plain text that is identified within news feeds of electronic news sources 165 (block 230). Specifically, the score is computed by multiplying the number of times the string of plain text is identified (i.e., the count parameter associated with the string of plain text) within the news feeds of electronic news sources 165, by a number representing the uniqueness of the string of plain text, and by a rating (i.e., a number that is a statistical correlation value) assigned to the string of plain text. Thus, in order to compute the score for the string of plain text, the program code queries rating database 150 to retrieve the number representing the uniqueness of the string of plain text and the rating assigned to the string of plain text. Subsequent to computing the score, the program code generates a recommendation for an action that needs to be performed based on the score (block 235), and then determines whether to generate an electronic notification to alert an end-user, of client computer 105a, of an anticipated change in the computer hardware capacity requirements for building, support, and maintenance of a networked computer system 170.

Specifically, if the score is less than or equal to a first configurable threshold value (the "NO" branch of decision block 240), then the program code estimates the computer hardware capacity requirements for building, support, and maintenance of a networked computer system based on the anticipated change (block 250). Next, the program code determines whether to issue a provisioning request to adjust allocation of computer hardware within networked computer system 170, in order to satisfy the computer hardware capacity requirements estimated.

Otherwise, if the score is greater than the first configurable threshold value (the "YES" branch of decision block 240), then the program code generates an electronic notification that includes the recommendation generated in order to alert an end-user (e.g., a system programmer/administrator) of an anticipated change in the computer hardware capacity requirements for building, support, and maintenance of networked computer system 170 (block 245). Thus, the first configurable threshold value, is a number that if exceeded indicates that a system programmer/administrator needs to be alerted of an anticipated change in the computer hardware capacity requirements for building, support, and maintenance of a networked computer system 170. Next, based on the anticipated change, the program code estimates the computer hardware capacity requirements for building, support, and maintenance of a networked computer system (block 250).

Specifically, to estimate the computer hardware capacity requirements the program code utilizes a computer hardware sizing calculation that includes computer hardware sizing calculations for each computer software application running within networked computer system 170. In the disclosed embodiment, the computer hardware sizing calculation utilized by the program code can be based on computer hardware sizing requirements of each computer software application running within networked computer system 170 and/or expected usage of each computer software application running within networked computer system 170. The computer hardware sizing requirements of a computer software application running within networked computer system 170 may be provided by a vendor of the computer software application.

Subsequent to estimating the computer hardware capacity requirements, the program code determines if the score is greater than a second configurable threshold value (decision block 255). If the score is less than or equal to the second configurable threshold value (the "NO" branch of decision block 255), then the program code ends. However, if the score is greater than the second configurable threshold value (the "YES" branch of decision block 255), then the program code generates a request to adjust allocation of computer hardware within networked computer system 170, in order to satisfy the computer hardware capacity requirements estimated (block 260). Next, the program code sends the request generated to client computer 105a for viewing, via graphical user interface 125, by the end-user (block 265). The end-user can perform an action, based on the request generated, to adjust the allocation of computer hardware within networked computer system 170. Subsequent to sending the request to client computer 105a the program code ends.

Figure 3:
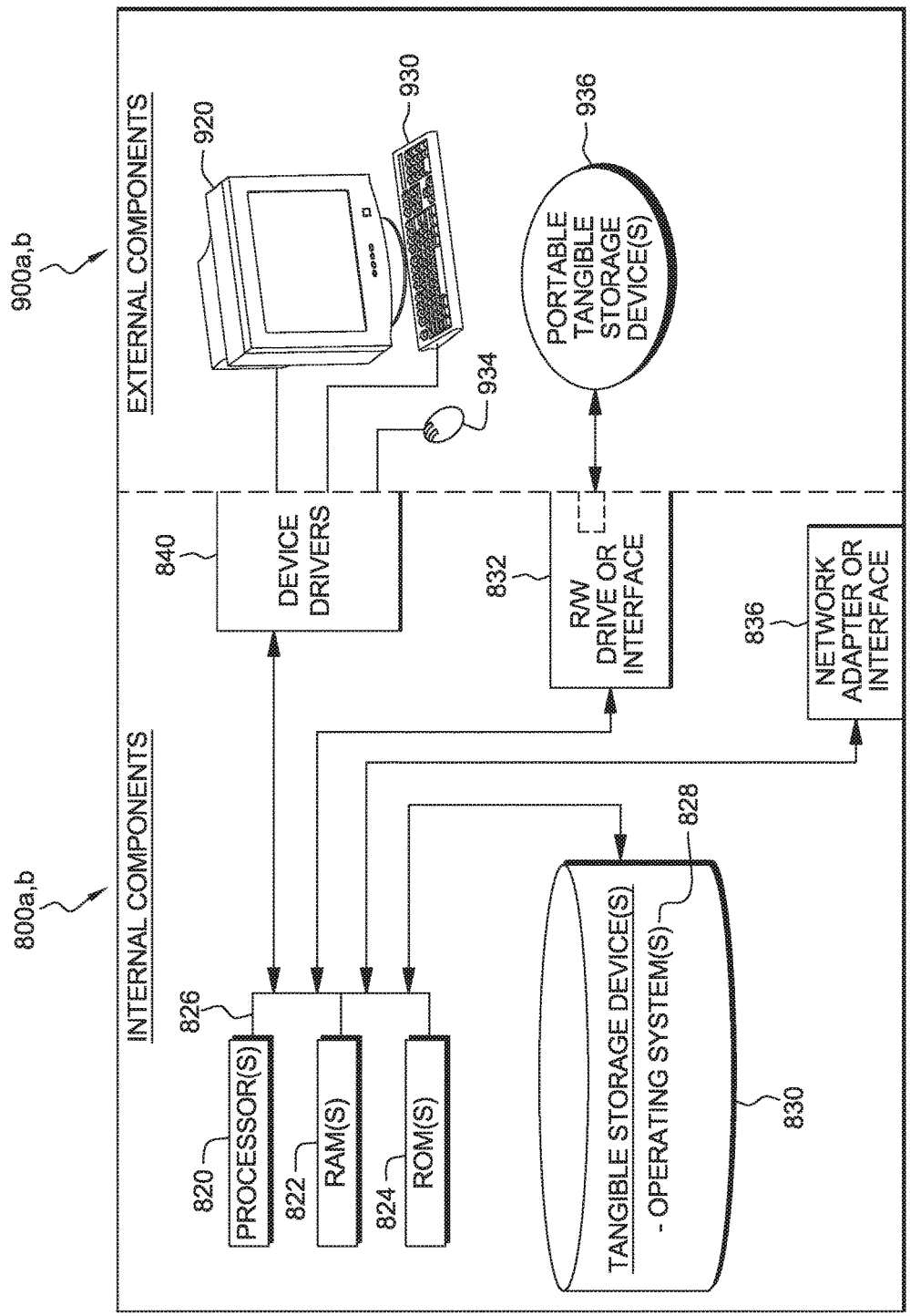
FIG. 3 is a block diagram depicting internal and external components of the client computers and the server computers of FIG. 1 according to an embodiment of the present invention.

FIG. 3 is a block diagram depicting a set of internal components 800a and 800b and a set of external components 900a and 900b that correspond to respective client computer 105a and server computer 105b. Internal components 800a and 800b each include one or more processors 820, one or more computer readable RAMs 822 and one or more computer readable ROMs 824 on one or more buses 826, and one or more operating systems 828 and one or more computer readable tangible storage devices 830. The one or more operating systems 828 and capacity planning client software 120 on client computer 105a; and capacity planning server software 135 on server computer 105b are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Capacity planning client software 120 on client computer 105a; and capacity planning server software 135 on server computer 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Capacity planning client software 120 on client computer 105a; and capacity planning server software 135 on server computer 105b can be downloaded to respective computers 105a and 105b from an external computer or external storage device via a network (for example, the Internet, a LAN, or a WAN) and respective network adapters or interfaces 836. From the network adapter or interface 836, capacity planning client software 120 on client computer 105a; and capacity planning server software 135 on server computer 105b are loaded into at least one respective hard drive or computer readable tangible storage device 830. The network may comprise copper wires, optical fibers, wireless transmission, routers, firewalls, switches, gateway computers and/or servers.

Each set of external components 900a and 900b can include a camera unit 130, a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for searching social media including news feeds to collect data utilized to estimate computer hardware capacity requirements for building, support, and maintenance of a networked computer system. Therefore, one or more embodiments of the invention have been disclosed by way of example and not limitation.

What is claimed is:
1. A method comprising:
computing, by one or more processors, a number of times that a string of text is identified within an online news feed;
computing, by the one or more processors, a score for the string of text, at least in part, by multiplying the number of times the string of text is identified within the online news feed by a rating assigned to the string of text, wherein the rating ranges from approximately 0.8 to approximately 1, wherein the rating represents a statistical correlation between a use of the string of text within the online news feed and a subsequent change in one or more computer hardware capacity requirements of a networked computer system;
in response to a determination that the score exceeds a first configurable threshold value, generating, by the one or more processors, an electronic notification, wherein the electronic notification alerts of an anticipated change in the one or more computer hardware capacity requirements of the networked computer system, wherein the electronic notification includes a unique identifier of a computer hardware affected by the anticipated change, and a recommendation for allocation of the computer hardware;
extrapolating, by the one or more computer processors, an expected number of matches for the string of text within the online news feed based on an actual number of matches over a period of time;

estimating, by the one or more computer processors, the one or more computer hardware capacity requirements based on the expected number of matches and a factor that represents a relevance of the online news feed for determining the one or more computer hardware capacity requirements;

in response to a determination that the score exceeds a second configurable threshold value, generating, by the one or more processors, a request to allocate the computer hardware within the networked computer system in order to satisfy the estimated one or more computer hardware capacity requirements;

sending, by the one or more processors, the request to a client computer for viewing; and allocating, by the one or more computer processors, the computer hardware based on the sent request.

2. The method of claim 1 further comprising:

generating, by the one or more processors, a list that includes the string of text defined by rules, wherein the rules also define the online news feed in which to search for the string of text; and subscribing, by the one or more processors, to the online news feed.

3. The method of claim 1 further comprising:

estimating, by the one or more processors, the one or more computer hardware capacity requirements based on the anticipated change; and sending, by the one or more processors, a first request to a first client computer to adjust allocation of computer hardware within the networked computer system.

4. The method of claim 3, wherein the step of estimating, by the one or more processors, the one or more computer hardware capacity requirements includes utilizing, by the one or more processors, a computer hardware sizing calculation based, at least in part, on one or more computer hardware sizing requirements of one or both of:

one or more computer software applications running within the networked computer system; and an expected usage of the one or more computer software applications running within the networked computer system.

5. The method of claim 1 further comprising:

creating, by the one or more processors, a record within a database for the string of text, wherein the record includes two or more of: i) a field for storing the string of text; ii) a field for storing a number representing a uniqueness of the string of text; iii) a field for storing a type of search for which the string of text is utilized to search the online news feed; iv) a field for storing a first unique identifier associated to a radio-frequency identification tag attached to the computer hardware; v) a field for storing a second unique identifier of a user to contact for an allocation adjustment of the computer hardware; and vi) a field for storing a rating assigned to the string of text; and computing, by the one or more computer processors, at least in part on the score for the string of text based on a count parameter and the record.

6. A computer program product comprising:

one or more computer-readable storage devices and program instructions stored on at least one of the one or more computer-readable storage devices, the program instructions comprising:

program instructions to compute a number of times that a string of text is identified within an online news feed;

program instructions to compute a score for the string of text, at least in part, by multiplying the number of times the string of text is identified within the online news feed by a rating assigned to the string of text, wherein the statistical correlation value ranges from approximately 0.8 to approximately 1, wherein the rating represents a statistical correlation between a use of the string of text within the online news feed and a subsequent change in one or more computer hardware capacity requirements of a networked computer system;

in response to a determination that the score exceeds a first configurable threshold value, program instructions to generate an electronic notification, wherein the electronic notification alerts of an anticipated change in the one or more computer hardware capacity requirements of the networked computer system, wherein the electronic notification includes a unique identifier of a computer hardware affected by the anticipated change, and a recommendation for allocation of the computer hardware;

program instructions to extrapolate an expected number of matches for the string of text within the online news feed based on an actual number of matches over a period of time;

program instructions to estimate the one or more computer hardware capacity requirements based on the expected number of matches and a factor that represents a relevance of the online news feed for determining the one or more computer hardware capacity requirements;

in response to a determination that the score exceeds a second configurable threshold value, program instructions to generate a request to allocate the computer hardware within the networked computer system in order to satisfy the estimated one or computer hardware capacity requirements;

program instructions to send the request to a client computer for viewing and program instructions to allocate the computer hardware based on the sent request.

7. The computer program product of claim 6 further comprising:

program instructions to generate a list that includes the string of text defined by rules, wherein the rules also define the online news feed in which to search for the string of text; and program instructions to subscribe to the online news feed.

8. The computer program product of claim 6 further comprising:

program instructions to estimate the one or more computer hardware capacity requirements based on the anticipated change; and program instructions to send a first request to a first client computer to adjust allocation of computer hardware within the networked computer system.

9. The computer program product of claim 8, wherein the program instructions to estimate the one or more computer hardware capacity requirements includes program instructions to utilize a computer hardware sizing calculation based, at least in part, on one or more computer hardware sizing requirements of one or both of:

one or more computer software applications running within the networked computer system; and an expected usage of the one or more computer software applications running within the networked computer system.

10. The computer program product of claim 6 further comprising:
   program instructions to create a record within a database for the string of text, wherein the record includes two or more of: i) a field for storing the string of text; ii) a field for storing a number representing a uniqueness of the string of text; iii) a field for storing a type of search for which the string of text is utilized to search the online news feed; iv) a field for storing a first unique identifier associated to a radio-frequency identification tag attached to the computer hardware; v) a field for storing a second unique identifier of a user to contact for an allocation adjustment of the computer hardware; and vi) a field for storing a rating assigned to the string of text; and
   program instructions to compute, at least in part, on the score for the string of text based on a count parameter and the record.

11. A computer system comprising:
   one or more computer processors;
   one or more computer-readable storage devices; and
   program instructions stored on at least one of the one or more computer-readable storage devices for execution by at least one of the one or more processors, the program instructions comprising:
      program instructions to compute a number of times that a string of text is identified within an online news feed;
      program instructions to compute a score for the string of text, at least in part, by multiplying the number of times the string of text is identified within the online news feed by a rating assigned to the string of text, wherein the statistical correlation value ranges from approximately 0.8 to approximately 1, wherein the rating represents a statistical correlation between a use of the string of text within the online news feed and a subsequent change in one or more computer hardware capacity requirements of a networked computer system;
      in response to a determination that the score exceeds a first configurable threshold value, program instructions to generate an electronic notification, wherein the electronic notification alerts of an anticipated change in the one or more computer hardware capacity requirements of the networked computer system, wherein the electronic notification includes a unique identifier of a computer hardware affected by the anticipated change, and a recommendation for allocation of the computer hardware;
      program instructions to extrapolate an expected number of matches for the string of text within the online news feed based on an actual number of matches over a period of time;
      program instructions to estimate the one or more computer hardware capacity requirements based on the expected number of matches and a factor that represents a relevance of the online news feed for determining the one or more computer hardware capacity requirements;
      in response to a determination that the score exceeds a second configurable threshold value, program instructions to generate a request to allocate the computer hardware within the networked computer system in order to satisfy the estimated one or computer hardware capacity requirements;
      program instructions to send the request to a client computer for viewing and
      program instructions to allocate the computer hardware based on the sent request.

12. The computer system of claim 11 further comprising:
   program instructions to generate a list that includes the string of text defined by rules, wherein the rules also define the online news feed in which to search for the string of text; and
   program instructions to subscribe to the online news feed.

13. The computer system of claim 11 further comprising:
   program instructions to estimate the one or more computer hardware capacity requirements based on the anticipated change; and
   program instructions to send a first request to a first client computer to adjust allocation of computer hardware within the networked computer system.

14. The computer system of claim 13, wherein the program instructions to estimate the one or more computer hardware capacity requirements includes program instructions to utilize a computer hardware sizing calculation based, at least in part, on one or more computer hardware sizing requirements of one or both of:
   one or more computer software applications running within the networked computer system; and
   an expected usage of the one or more computer software applications running within the networked computer system.

15. The computer system of claim 11 further comprising:
   program instructions to create a record within a database for the string of text, wherein the record includes two or more of: i) a field for storing the string of text; ii) a field for storing a number representing a uniqueness of the string of text; iii) a field for storing a type of search for which the string of text is utilized to search the online news feed; iv) a field for storing a first unique identifier associated to a radio-frequency identification tag attached to the computer hardware; v) a field for storing a second unique identifier of a user to contact for an allocation adjustment of the computer hardware; and vi) a field for storing a rating assigned to the string of text; and
   program instructions to compute, at least in part, on the score for the string of text based on a count parameter and the record.

* * * * *